March 26, 1935.  F. J. MANNING  1,995,892
APPARATUS FOR RETREADING TIRES
Filed Dec. 3, 1932  2 Sheets-Sheet 1
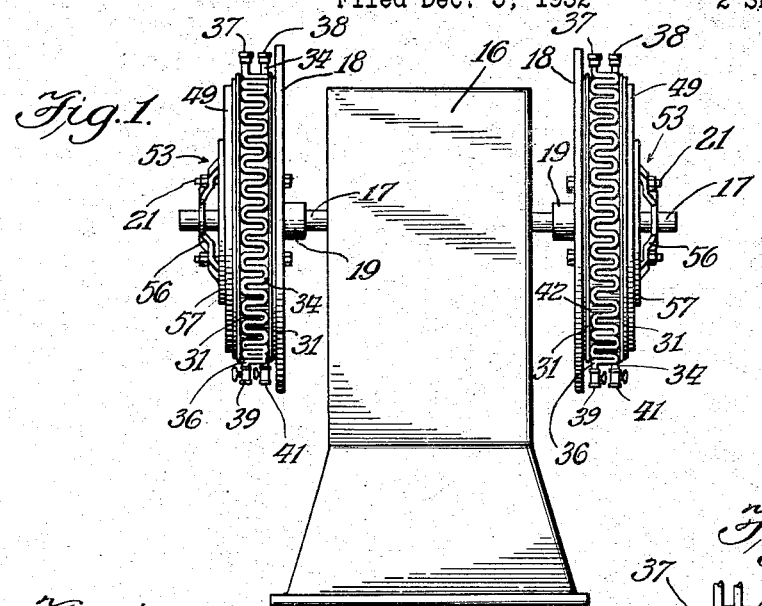
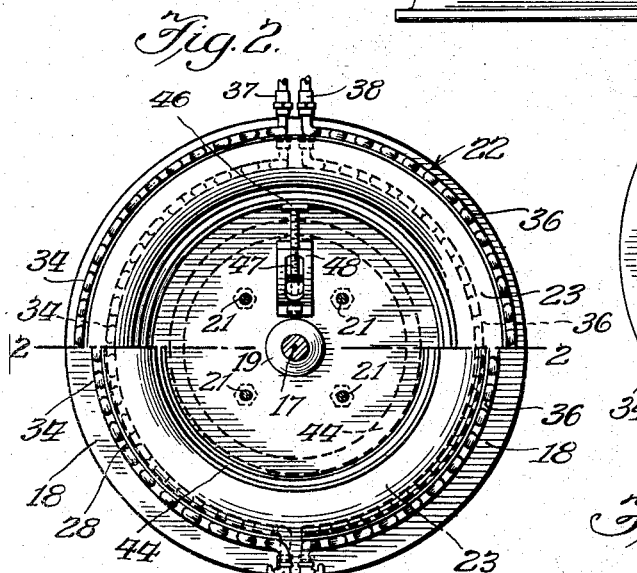
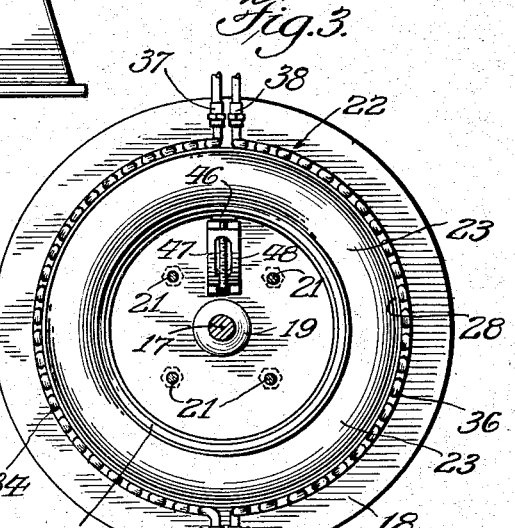
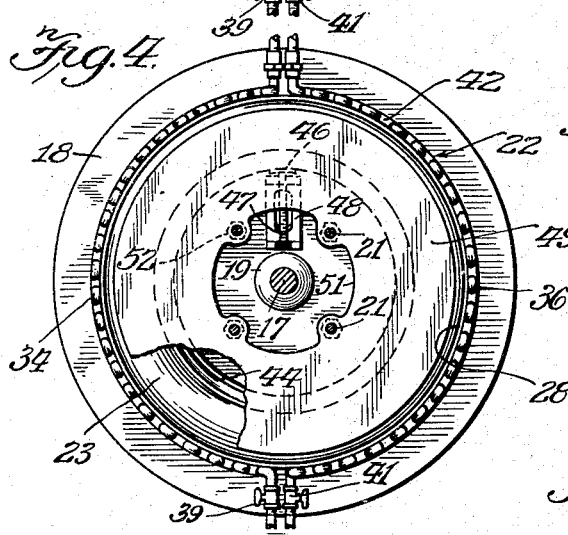
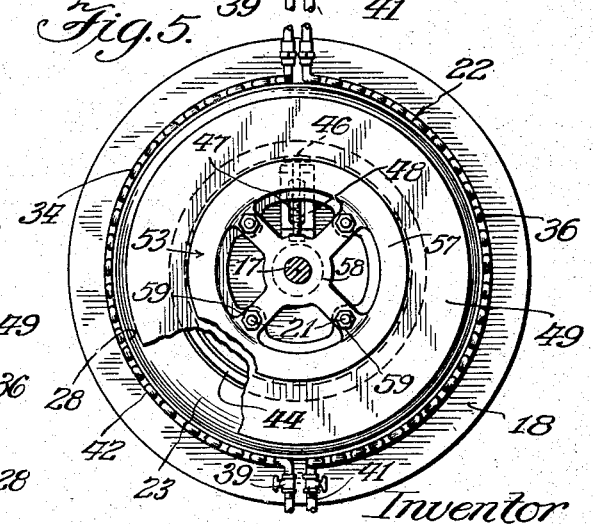
Inventor
Frank J. Manning.
By Mueller & McLaughlin Attys.

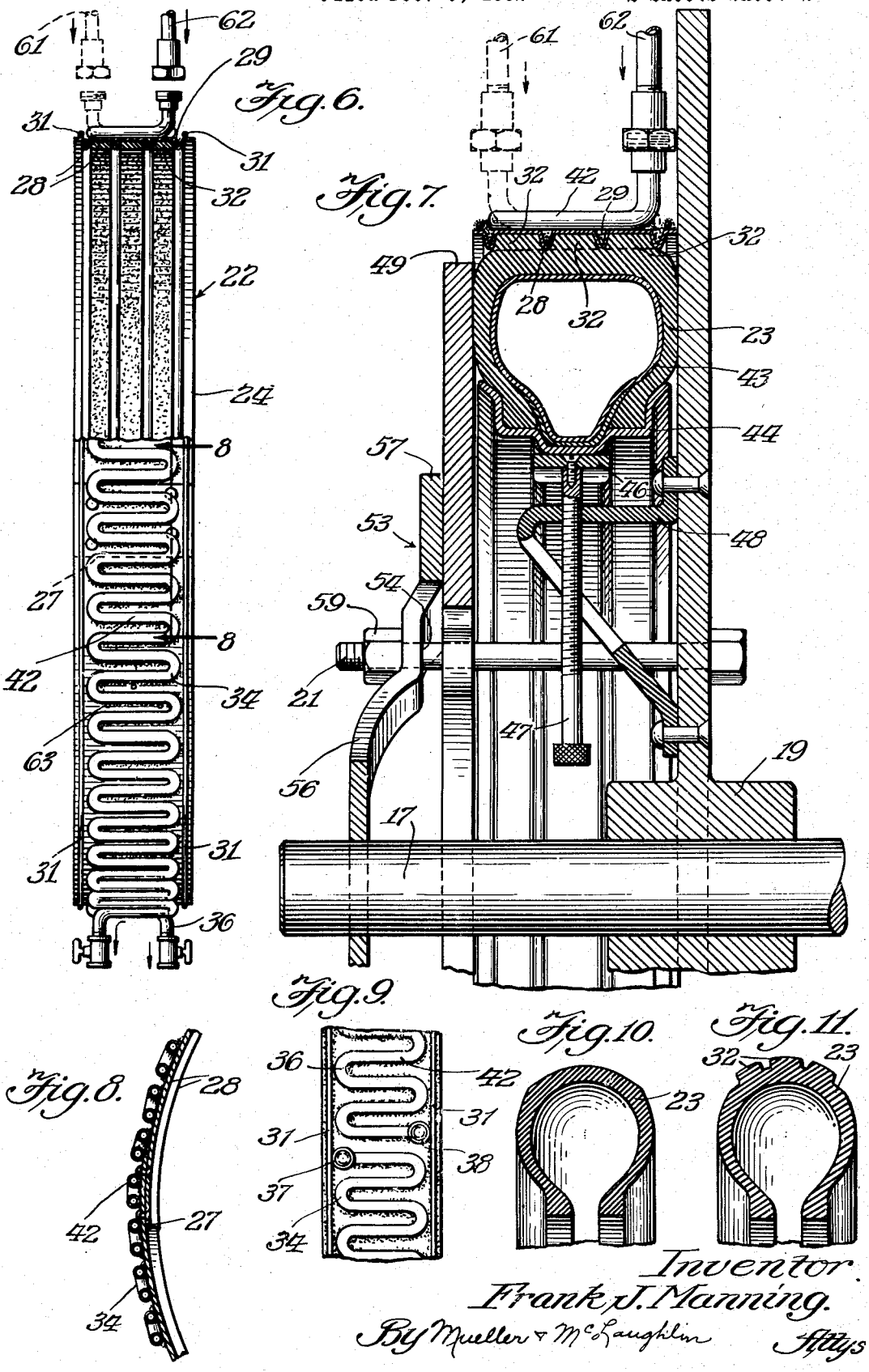

Patented Mar. 26, 1935

1,995,892

UNITED STATES PATENT OFFICE 1,995,892

APPARATUS FOR RETREADING TIRES

Frank J. Manning, La Grange, Ill.

Application December 3, 1932, Serial No. 645,599

12 Claims. (Cl. 18—18)

My invention relates in general to tire vulcanizers and in particular to a method and apparatus for vulcanizing a new tread on a worn automobile tire casing.

In retreading worn tire casings, it has been the customary practice to vulcanize a new tread on only a portion of the tire at a time by means of a sectional mold, or where a complete ring mold has been used so as to vulcanize the complete tread in one operation, this mold is ordinarily provided with means for breaking it into two or more sections to allow the insertion of the tire in the mold. In other retreading apparatus, a single piece ring mold has been used but this, as does the two previously described types, employs a cast iron mold which is not only very heavy and bulky but is also very expensive to manufacture. Inasmuch as there are some sixteen or more different size tires in general use, a set of molds to take care of all sizes represents a very large investment of money.

With the prior vulcanizing apparatus, the molds used therewith are each rigid so that unless the tire casing is made to conform to the shape of the mold irregularities on the surface of the casing are emphasized in the retread. Furthermore, open spaces develop between the mold and casing which allows seepage of the new rubber tread during the curing process.

In addition to the mold itself, a supply of heat is necessary to effect the vulcanizing. Steam is the customary source of heat, and is ordinarily supplied in jackets surrounding the mold or in a plurality of annularly extending coils each lying in a plane parallel to the plane of the mold. In the use of a full steam jacket case integral with the mold the cost of the apparatus is very large and the weight of the whole becomes so great as to make handling difficult, while in the use of annularly extending coils a rigid mold results with the disadvantages heretofore discussed.

It is an object of my invention to provide an improved method and apparatus for retreading a worn tire casing.

It is a further object to provide a retreading apparatus which is flexible enough to accommodate every size of tire without a great amount of equipment and consequent large investment of money.

An object of my invention is also to provide a flexible mold in the retreading apparatus which will conform to the shape of the tire.

It is also an object to provide a mold to be used in connection with this apparatus which is light in weight so as to be easily handled and simple in structure to make for sturdiness and permanence.

A further object is to provide a mold with my apparatus utilizing steam heat for vulcanizing purposes, with the steam distributed over the mold in an inexpensive structure in a manner as to provide a uniform curing of the tread onto the casing, and A further object is to provide a tire mold with the complete apparatus which has means for distributing the steam over the surface of the mold in the curing process in a manner such that heat losses are very low and the efficiency of the apparatus is high.

Other objects and advantages of the apparatus will be apparent from the succeeding description and drawings, in which Fig. 1 is a side elevation of the complete tire retreading apparatus;

Fig. 2 is a front elevation of the mold support with a mold and tire in position on the support. The position of various molds accommodating different sizes of tires is illustrated in this figure.

Fig. 3 is a front elevation of a tire casing in position in the mold with the casing and mold assembly carried on the mold support;

Fig. 4 is a front elevation showing the outside washer plate in position against the outer wall of a tire casing, with the latter properly inserted in the mold;

Fig. 5 is a front elevation partly in section showing the complete mold support and clamping structure;

Fig. 6 is a fragmentary side elevation partly in section of the tire mold;

Fig. 7 is a cross-sectional view through line 7—7 of Fig. 1;

Fig. 8 is a sectional view of the fragmentary portion of the tire mold along line 8—8 of Fig. 6;

Fig. 9 is a top plan view of the fragmentary portion of the tire mold;

Fig. 10 is a sectional view of a tire casing before retreading; and

Fig. 11 is a sectional view of a tire casing after the new tread has been vulcanized around the outer surface of the tire.

With the ordinary pneumatic automobile tire, the side walls in general outwear the top of the casing so that when the tread has become completely worn from the casing, the side walls are more or less in their original condition. I have found by simply buffing off the outside face of the tire so as to provide a rough clean surface, a new tread may be vulcanized thereon and make possible the use of the tire for a great many more miles. In practicing my invention, to retread a worn tire casing I provide a stand having an axle rigidly secured thereto with mold supports rotatably carried by the axle on each side of the stand. The mold supports comprise a heavy back plate with a plurality of bolts protruding therethrough and an adjustable bracket for centering the tire mold over these bolts with clamping plates on the outside of the tire mold and casing to hold the mold securely to the support.

Referring now to the drawings, the stand 16 may be constructed in any desired manner so as to provide a sturdy and rigid upright in which an axle 17 may be rigidly secured. A back plate 18 which is preferably a heavy disc-shaped iron casting is provided with a bearing 19 to fit over the axle 17 on each side of the stand 16. Each of the back plates 18 is large enough to accommodate the largest size tire. Heavy threaded bolts 21 extend longitudinally from the back plate for clamping the remainder of the vulcanizing apparatus to this plate, as will be hereinafter described. I have found that four bolts provide the necessary clamping for the apparatus.

A mold 22 is provided for vulcanizing the new tread to the casing 23. This mold comprises a comparatively thin sheet metal circular rim 24 with overlapping ends 27 riveted as shown in Fig. 8 or secured in any other suitable manner. Grooves 28 are rolled in the rim and project inwardly over the entire inner surface. Heretofore it has been necessary to use heavy cast molds for retreading tires because of the large pressures exerted outwardly on the mold in the curing process. I employ a comparatively thin, sheet metal rim in the mold and combat the large pressures by means of piano-wire reinforcements. Several turns of piano wire 29 lie in each of the grooves 28 and are twisted together at the two ends in each groove. To hold the turns of wire securely in place, solder is flowed in on top of them in each groove practically filling the grooves. Additional reinforcement is provided by a single loop of steel wire 31 around each outside edge of the rim 24.

Rubber strips 32 are vulcanized onto the tire and provide the desired retreading. These raw rubber strips 32 are placed in the channels 33 between the successive grooves 28 in the rim before the tire casing 22 is placed in the mold. The curing of these strips onto the tire casing is then effected by means of heat from steam circulated through two sets of coils 34 and 36 respectively. Satisfactory coils have been formed from small copper tubing and bent so as to extend transversely of the rim 24 and coil back and forth around the entire outer surface. As noted above, this steam supply is circulated through the two similar coils 34 and 36 which have their inlets 37 and 38 adapted for receiving an ordinary pipe coupling and their outlets 39 and 41 in the form of a small valve. The coils are secured to the rim 24 by welding at each curved portion or by any other suitable anchoring means at this portion. The transversely extending sections 42 are spaced closely together and extend over the rubber strips to provide a very complete distribution of the heat over the entire surface of the rim and the area of the casing 23 being treated. By the use of two coils 34 and 36, each extending over one-half the surface of the rim 24, the steam travels half the distance that it would did the path extend completely around the mold so that the temperature remains practically constant from inlet to outlet. As a result, the curing is effected quickly and in a very efficient and satisfactory manner. Furthermore, the coil constructed in the manner described has a certain amount of flexibility which is imparted to the mold when the coils are secured to the rim 24. As a result the mold conforms more readily to the shape of the casing when it is fitted thereon.

In carrying out the process, the tire 23 is collapsed by any well known means. The mold 22 with the rubber strips 32 lying in each one of the channels 33 is placed over the outside of the tire casing and the latter is allowed to resume its normal position. A different sized mold is used for each size of tire, and the molds are designed so that they fit tightly over the casing when the collapsing device is removed and the tire assumes its normal position. An ordinary tube 43 is placed inside the tire casing and inflated very slightly. A wheel rim 44 of any design but of the proper size to fit the casing is then placed in its normal position on the inside of the tire. After this assembly has been completed, the mold and casing are placed against the back plate 18 with the rim 44 resting on the head 46 of a threaded adjusting screw 47. This screw is adjustable in a bracket 48 riveted or secured to the back plate 18 in any desired manner so that the mold assembly may be centered on the back plate 18 with respect to the axle 17 and the bolts 21. This adjustment is provided so that any sized mold may be centered with respect to the single size back plate and axle 17. The manner in which this works out is shown in Fig. 2 where a complete mold is illustrated and a half section or two other sizes of molds is shown outside the full mold and above and below line 2—2.

After the centering operation is completed, a washer plate 49 (Fig. 4) is placed over the bolts 21 and rests against the outer side wall of the casing 22. This washer 49 may be simply a heavy cast plate with an opening 51 in the center thereof so as to make it possible to get at the air valve in the tube to inflate the latter. Apertures 52 are formed adjacent the inner opening 51 in the washer and adapted to fit over the bolts 21 to facilitate handling and centering of the washer. The washer plate extends substantially over the entire outer side wall of the casing 23 so as to provide a support similar to the back plate 18 on the rear side wall of the casing. It is not necessary to completely cover the side wall so that it has been found possible to obtain a satisfactory support to the wall with only three or four different sizes of washers for the entire range of sizes in the tires.

With the washer plate 49 in position, a clamping wheel 53 is placed over the heads of the bolts 21 through apertures 54 in arms 56 of the wheel. This clamping wheel has an annular ring 57 with the aforementioned arms 56 extending crosswise within the central portion of the ring and joined by a central support 58 apertured to extend over the axle 17. This wheel need be only a single size, inasmuch as the construction of the washer plate remains constant adjacent the inner opening so that the ring 57 of the wheel will always contact a sufficient portion of the washer plate adjacent the central opening. The arms 56 of the wheel are convex with respect to the outside surface so as to provide a stronger clamping support when clamping the entire apparatus together. After the clamping wheel is in position as noted, nuts 59 are threaded onto each bolt 21 and are tightened up to the desired position while the mold and back plate assembly is rotated on the axle 17. Rotating the mold and back plate assembly in this manner enables the operator to see whether or not the spacing between plate 18 and plate 49 is uniform, and tighten the bolts accordingly.

The tube 43 is now inflated to any desired air pressure and in this connection I have found that eighty pounds pressure in the tube operates very satisfactorily to press the outer casing against the rubber strips 32 which are to be cured or vulcanized to the casing. A snug fit between the mold and tire casing is insured as a result of the flexibility of the molds. With the tubing coiled back and forth across the surface of the rim 24 and secured to the rim at the curved portion, a certain flexibility results in the coil which allows the rim, flexible in itself, to assume the shape of the casing 23. This is very important in that the grooves 28 then press firmly against the face of the casing to prevent seepage of the rubber out of the channels 33 during the vulcanizing process. The comparatively large air pressure mentioned above necessitates a very sturdy mold and support plates 18 and 49. The requisite strength of my mold is obtained by means of the construction described with the piano wire 29 reinforcement and steel wire rings 31. After inflating the tube to the desired pressure, steam supply lines 61 and 62 are coupled to inlets 37 and 38 respectively and steam is fed to the coils 34 and 36 to promote the vulcanizing process. During this curing, the rubber strips 37 become vulcanized to the casing 22 and form an integral portion of the casing as shown in Fig. 11. During this curing process, there is an expansion of the rubber strips which is provided for by means of bleeder apertures 63 at intervals around the rim 24. The bleeder apertures are drilled at different intervals in the channels 33 and may vary from five to eight inches apart in each channel over the entire rim. The rubber expands out of these apertures in the form of a very thin peg and may be clipped off after the vulcanizing process is completed.

During the time necessary to complete the vulcanizing process, the steam may flow through the separate coils 34 and 36 and discharge from the valves 39 and 41 into the room in which the apparatus is situated or discharge pipes of one kind or another may be connected to the valves to carry off the steam.

With this construction making possible the use of the thin sheet metal rim 24, it is comparatively inexpensive to provide full ring molds to accommodate every size tire, and the weight of each mold, which is made up largely by the weight of the two coils, facilitates the handling of the mold to place the same in position on the support stand. Rotating the mold and support assembly on the axle 17 insures a uniform adjustment of the mold around the entire casing of the tire so that the casing remains rigid during the entire vulcanizing operation.

Although I have described my invention in detail to enable those skilled in the art to practice the same, it is obvious that I do not limit myself to the particular form shown, and the invention is limited only by the scope of the appended claims.

What I claim as new and desire to protect by Letters Patent of the United States is:

1. In a tire retreading apparatus, a support stand having a horizontal shaft carried thereby, a back support plate carried vertically on said shaft and having clamping bolts extending horizontally therefrom, a retreading mold having a steam chamber around its outer periphery with an inlet at the top and an outlet at the bottom, said mold adapted for fitting over a tire casing to retread the same, means secured to said back plate for carrying the mold and tire assembly in a vertical position to center said assembly on the back plate with the rear wall of the casing resting against said back plate, means positioned outside of the front wall of the casing and co-operating with the bolts and back plate for rigidly supporting said tire casing at the front and rear walls.

2. In a tire retreading apparatus, a support stand having a horizontal shaft carried thereby, a back support plate carried on said shaft and having clamping bolts extending horizontally therefrom, a retreading mold adapted for fitting over a tire casing to retread the same, a bracket secured to said back plate having a screw adjustable therein with said screw adapted for holding said mold and tire assembly in a vertical position to center the same on the back plate with respect to the shaft and clamping bolts with the rear wall of the tire casing resting against the back plate, means positioned outside of the front wall of the casing and co-operating with the bolts and back plate for rigidly supporting said tire casing at its front and rear walls, and a vulcanizing heating element for said mold.

3. In a tire retreading apparatus, a support stand having a horizontal shaft carried thereby, a back support plate carried vertically on said shaft and having clamping bolts extending horizontally therefrom, a retreading mold having a rubber retread receiving chamber on one side thereof adapted for fitting over a tire casing, means secured to said back plate for carrying the mold and tire assembly in a vertical position to center said assembly on the back plate with a rear wall of the casing resting against said back plate, a washer plate positioned over the bolts and resting against the front wall of the casing, a clamping wheel carried by the bolts and co-operating therewith to clamp the mold and tire assembly between the back plate and washer plate for supporting the front and rear walls of the tire casing, and a vulcanizing heating element for said mold.

4. In an apparatus of the character described, a tire mold for fitting over a tire casing, said mold comprising a relatively thin annular metal rim grooved inwardly to form beads on the inside surface of the rim, said mold adapted to receive rubber retread strips between said beads, means for reinforcing said rim to limit radial expansion thereof during the vulcanizing process, said means including a continuous strand of wire wound into each of said grooves by a plurality of turns, and a vulcanizing heating coil extending circumferentially of said rim.

5. In an apparatus of the character described, a tire mold adapted for receiving a rubber retread on one side thereof for fitting over a tire casing with the retread positioned against the casing for vulcanizing thereon, said mold comprising a relatively thin annular metal rim, means for reinforcing said rim to limit radial expansion during the vulcanizing process, said means including a wire hoop extending circumferentially and secured adjacent each outer edge of the rim, and a heating coil secured to the outer face of said rim extending transversely back and forth between said hoop.

6. In an apparatus of the character described, a tire mold adapted for receiving a rubber retread on one side thereof for fitting over a tire casing with the retread positioned against the casing for vulcanizing thereon, said mold comprising a relatively thin annular metal rim having grooves therein opening onto the outer surface of said rim, means for reinforcing said rim to limit radial expansion during the vulcanizing process, said means including a continuous strand of wire wound into each of said grooves by a plurality of turns, a wire hoop extending circumferentially adjacent each outer edge of the rim, and a vulcanizing heating coil secured to the outer face of said rim.

7. In a tire retreading apparatus, a mold for fitting over a tire casing to retread said casing, said mold comprising a relatively thin annular metal rim, a pair of oppositely positioned heating coils secured to the rim, each coil comprising tubing having integral curved and straight portions with the straight portions extending transversely of the face of the rim joined with curved portions at the ends thereof to provide a continuous heating tube extending circumferentially over one-half the rim with said coils each having a steam inlet at one end and an outlet at the other end to provide steam therefor to heat the coils and mold.

8. In a tire retreading apparatus, a support stand, a mold for fitting over a tire casing for vulcanizing a rubber retread thereon removably carried on the stand, a pair of oppositely positioned heating coils secured to the outside of the mold each having a steam inlet at the top of the coil and an outlet at the bottom thereof with a continuous tubing therebetween extending circumferentially back and forth over the face of the mold, and means for rigidly clamping said mold and tire assembly in a vertical position on the stand whereby the mold is heated over its entire surface, and the steam passing through the coil and the water condensing therefrom will pass readily from the coils.

9. A tire retreading apparatus including a back plate tire support, a clamp for clamping the tire against the back plate and carried in definite position on the back plate, tire clamping plates of different diameters for different tires, and tire supporting means adjustably supported by the back plate for centering a tire relative to the clamp and clamping plate according to the size of tire to be supported.

10. In a tire retreading apparatus, a support stand for rigidly carrying a tire mold and tire casing assembly, means in said apparatus for clamping a plurality of different sized mold and tire assemblies on said stand, said means including an enlarged back support plate, an adjustable screw supported on said plate for carrying a tire assembly to center the same with respect to the plate, a plurality of clamping bolts extending horizontally from said back plate, a washer plate for clamping against the tire casing, and a clamping wheel carried on said clamping bolts and adapted to clamp any one of a plurality of washer plates corresponding in size to the tire assembly on the stand to rigidly support said assembly in a vertical position thereon.

11. In a tire retreading apparatus, a tire mold for fitting over the circumference of a tire casing for receiving a rubber strip between the mold and casing to retread the same, said mold comprising a relatively thin annular metal rim grooved inwardly to form circumferentially extending beads on the inside surface, heating means carried on the outside of the rim including a pair of separate oppositely positioned heating coils, each comprising tubing extending back and forth across the outer face of the rim with a steam inlet at the top and an outlet at the bottom, the coils together acting to apply heat over the entire surface of the rim, and means for reinforcing said rim to limit radial expansion from excessive pressure in the tire, said means including wire reinforcing carried in said grooves in the rim to provide a continuous wire band around the rim in each groove.

12. In a tire retreading apparatus, a tire mold for fitting over a tire casing to receive a rubber retread strip between the mold and tire casing to retread said casing, said mold comprising a relatively thin annular metal rim, and a heating coil secured to the outer face of the rim comprising tubing having integral curved and straight portions with the straight portions extending transversely of the face of the rim to the width of the retread strip joined with curved portions at the ends thereof for distributing heat transversely of the outer face of the rim and circumferentially thereof for vulcanizing the rubber strip to the tire casing, said rim and heating coil extending around the entire circumference of the casing, said rim being grooved inwardly over the circumference thereof to form circumferentially extending beads on the inside surface, and means for reinforcing said rim to limit radial expansion from excessive pressure in the tire, said means including a plurality of turns of wire of high tensile strength lying in each of said grooves in the rim.

FRANK J. MANNING.